(12) United States Patent
Meister et al.

(10) Patent No.: US 11,404,862 B2
(45) Date of Patent: Aug. 2, 2022

(54) METHOD, CONTROL UNIT, AND ELECTRICAL NETWORK

(71) Applicant: Robert Bosch GmbH, Stuttgart (DE)

(72) Inventors: Christian Meister, Sachsenheim (DE); Christian Michael Praetorius, Obersulm (DE); Helmut Suelzle, Pleidelsheim (DE); Otmar Bussmann, Abstatt (DE); Herbert Vollert, Vaihingen/Enz (DE); Zied Terchella, Bietigheim Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 572 days.

(21) Appl. No.: 16/534,170

(22) Filed: Aug. 7, 2019

(65) Prior Publication Data

US 2020/0059087 A1 Feb. 20, 2020

(30) Foreign Application Priority Data

Aug. 15, 2018 (DE) .......................... 102018213747.1

(51) Int. Cl.
| | |
|---|---|
| *H02H 7/08* | (2006.01) |
| *H02H 3/24* | (2006.01) |
| *B60R 16/03* | (2006.01) |
| *H02H 1/00* | (2006.01) |
| *H02H 7/22* | (2006.01) |

(52) U.S. Cl.
CPC .............. *H02H 3/24* (2013.01); *B60R 16/03* (2013.01); *H02H 1/0007* (2013.01); *H02H 7/22* (2013.01)

(58) Field of Classification Search
CPC ...... H02H 7/0833; H02H 7/0811; H02H 7/22; B60R 16/03
See application file for complete search history.

(56) References Cited

U.S. PATENT DOCUMENTS

| | | | | |
|---|---|---|---|---|
| 4,752,853 A | * | 6/1988 | Matsko ................. | H02H 3/006 361/97 |
| 4,809,125 A | * | 2/1989 | Matsko ................. | H02H 3/006 361/93.3 |

\* cited by examiner

*Primary Examiner* — Adolf D Berhane
*Assistant Examiner* — Afework S Demisse
(74) *Attorney, Agent, or Firm* — Norton Rose Fulbright US LLP; Gerard Messina

(57) ABSTRACT

A method is described for operating an electrical system, in particular, of a motor vehicle, which includes at least one electrical consumer, at least one energy source for electrical energy, and at least one control unit, the consumer being test activated by the control unit for the purpose of initializing a start of the system and a voltage level of an electrical voltage in the system being monitored and compared to a predefinable minimum value, and the activation being interrupted if the voltage level falls below the minimum value, and the consumer being subsequently test reactivated. It is provided that the number of the interruptions is counted and the consumer is deactivated at least for a predefinable period of time upon reaching a predefinable maximum number.

13 Claims, 2 Drawing Sheets

METHOD, CONTROL UNIT, AND ELECTRICAL NETWORK

FIELD OF THE INVENTION

The present invention relates to a method for operating an electrical system, in particular of a motor vehicle, which includes at least one electrical consumer, at least one energy source for electrical energy, and at least one control unit, the consumer being test activated by the control unit for the purpose of starting the system and an electrical voltage in the system being monitored and compared to a predefinable minimum value, and the activation being interrupted if the voltage level falls below the minimum value, and the consumer being subsequently test reactivated.

The present invention furthermore relates to a control unit for carrying out the above-named method, as well as to an electrical network, in particular a traction system or an electrical system of a motor vehicle including a control unit of this type.

BACKGROUND INFORMATION

Methods of the type mentioned at the outset are already known from the related art. In order to carry out a reliable system start of an electrical network or system, it is known to test one or multiple components of the network, in particular those which have a high energy demand, prior to the start-up of the network and to release the consumer for activation only after successful testing. For this purpose, it is known to test activate the electrical consumer, for example an actuator, such as an electric motor, in particular a synchronous motor, so that it takes up energy from the system, in particular from the electrical energy store. In this case, the voltage of the network or system is monitored to check whether the network is capable of providing the energy required for the consumer. For this purpose, the voltage level of the network, for example the voltage level of the energy source, is monitored and, in particular, continuously compared to a predefinable minimum value. In control units, this minimum value is also frequently referred to as a safety cutoff threshold. If the safety cutoff threshold is fallen below, the consumer or the associated control unit is deactivated to prevent the network and/or the energy store from being damaged.

Increasing service life is usually associated with decreasing capacity of an electrical energy store, and electric lines that are subject to corrosion acquire an increased electrical resistance over a prolonged period of time, which means that the voltage in the system may fall below the above-named minimum value when the consumer is activated. If this error event occurs, the consumer is test reactivated after a short period of time. If the source of error persists, for example, an excessively low charge state of the battery or of the energy source, this may result in the consumer being repeatedly test activated. This means that, on the one hand, energy continues to be retrieved from the system and, on the other hand, the consumer as well as the control unit are permanently loaded, in particular, the temperature load of the components possibly also resulting in damage over the long term.

SUMMARY

The method according to the present invention has the advantage that an excessively repeating test cycle is avoided and an overtaxing of the components of the network is thus prevented. According to the present invention, this is achieved by counting the number of the interruptions and by at least temporarily deactivating the consumer when a predefined maximum number is reached. In this way, the test cycle is interrupted at least for the predefined period of time and the consumer as well as the control unit and energy source are spared. A load is reliably prevented and the service life of the network overall is thus increased. The present invention provides that the number of the interruptions is counted. It is thus assumed that at least two interruptions are counted prior to deactivating the consumer. More than two, for example five or ten, interruptions are preferably selected as the maximum number and further activation of the actuator is prevented as a result of its deactivation upon reaching the maximum number.

According to one preferred refinement of the present invention, a warning is output upon the deactivation of the consumer. This warning is output visually or acoustically, for example, to a user of the system, for example to the driver of a motor vehicle that includes the system, so that the driver is informed about the error and may take countermeasures, for example. Alternatively or additionally, an internal warning is output and stored, for example, as an error message in a memory of the control unit, so that the error may be read out during a subsequent repair shop visit and remedied by the repair shop.

According to one preferred refinement of the present invention, an emergency operation of the system is engaged upon the deactivation of the consumer. By taking this safety measure, the system takes into account that a certain consumer, namely the one which has been deactivated, is no longer available. If the safety component involved is not required, further operation of the motor vehicle may also be carried out without this consumer. If, for example, the consumer is a drive motor that is optionally connectable to the drive train, the motor vehicle may also be further operated without the drive motor with the aid of an internal combustion engine, which is also present. In this emergency operation, only the electric drive would not be available.

It is furthermore preferably provided that a counter is set in a non-volatile memory of the control unit upon each interruption, in order to count the number of the interruptions. This allows for an easy counting of the interruptions, in particular for the control unit. Alternatively, the counter is set upon each test activation of the consumer, in order to count the number of the test activations that occurred. Only then, when it was possible to successfully carry out a test activation, is the counter content deleted, thus also allowing for an easy counting of the interruptions. Storing or recording the counter in the non-volatile memory has the advantage that the counter information is available even in the case of a restart of the consumer or of the entire system, i.e., for example even when the system has been turned off or shut down completely due to excessively low available electrical voltage or for other reasons.

It is furthermore preferably provided that an output voltage of the energy source is monitored as the voltage of the system. It is thus directly ascertainable whether the available energy of the energy source is sufficient to operate the consumer.

According to one preferred refinement of the present invention, the voltage level continues to be monitored after the deactivation of the consumer and the consumer is partially reactivated if the voltage level exceeds a predefinable limiting value. Once the consumer has been deactivated, the monitoring of the voltage level of the network is thus continued. If it is detected that the voltage level exceeds the predefinable limiting value, which is equal to or higher than the minimum value, it is assumed that more energy is now available and a test activation of the consumer may be carried out safely for the operation of the overall network. If it is detected that the voltage level exceeds the limiting value, in particular, after a predefinable period of time has elapsed, the consumer is first test activated and the above-described method is carried out. Only after a successful test activation, during which the voltage level does not fall below the minimum value mentioned above, is the consumer activated and started up.

It is furthermore preferred that an operating mode of an electric generator monitors the system after the deactivation of the consumer and test activates the consumer, in particular, upon detecting a regenerative operation. It is assumed that as soon as a generator of the system is operated regeneratively, electrical energy is generated and made available to the system. Accordingly, it is assumed that the voltage level should now be sufficient to carry out a successful test activation of the consumer.

After successfully carrying out a test activation of the consumer, i.e., during which the minimum value of the voltage level is not fallen below, the consumer is preferably activated and the number of the interruptions that previously occurred is deleted or set to zero. The system is thus reset to its original state and the error memory is deleted. By activating the consumer, it is now made available for further use.

The control unit according to the present invention is characterized in that it is specifically configured to carry out the method according to the present invention when used according to its intended purpose. This results in the advantages already mentioned above.

The electrical system is characterized by the control unit according to the present invention. This results in the advantages mentioned above.

Other advantages and preferred features and feature combinations result, in particular, from the previous description. In the following, the present invention is to be explained with reference to the drawings.

DETAILED DESCRIPTION

Figure 1:
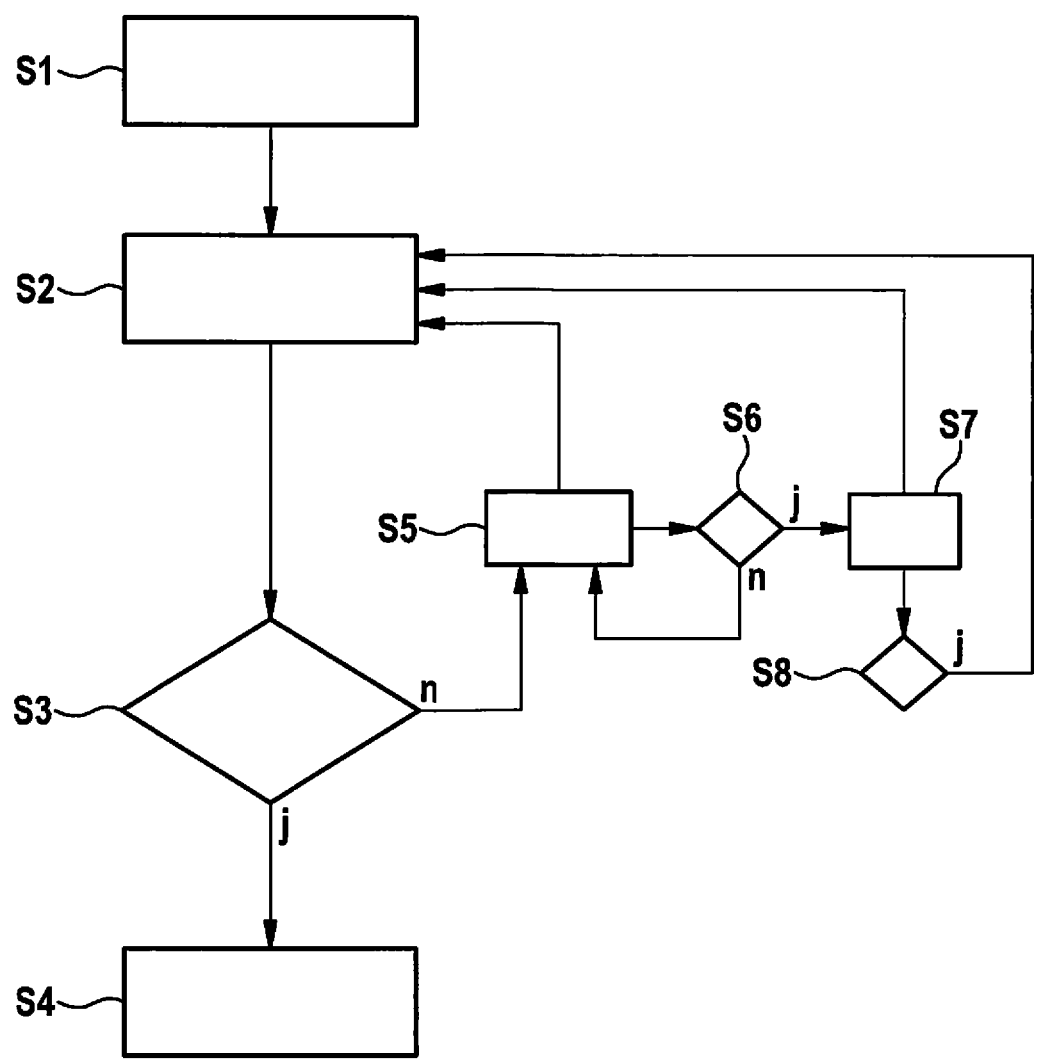
FIG. 1 shows a flow chart for explaining an advantageous method for operating an electrical system.

In a simplified flow chart, FIG. 1 shows an advantageous method for operating an electrical system which includes at least one electrical consumer, at least one energy source for electrical energy, in particular, a traction battery, and at least one control unit. The system optionally includes multiple consumers, which draw energy from the energy source to be able to fulfill their function. At least one of the consumers is an electric machine, preferably a synchronous machine, which is also used as the drive motor for the motor vehicle that includes the system.

In a first step S1, the system as a whole is started up.

Subsequently, the individual consumers are tested with regard to their functionalities. The method is to be explained more specifically in the following with regard to one of the consumers, in particular the synchronous machine mentioned previously. To test its functionality, the relevant consumer is test activated in a step S2. This means that the consumer is activated in such a way that it is started up and electrically energized, but in particular without carrying out a function in a manner which is perceptible for a user of the motor vehicle. Thus, for example, the electric motor is acted upon by a test current, which is not sufficient to induce a rotary motion, but sufficient to determine the functionality of the synchronous motor.

In a following step S3, a request takes place. In this request, the electrical voltage prevailing in the system is detected, while the consumer is being test activated, and compared to a predefined minimum value. The minimum value represents a cutoff threshold, which is used by the control unit to adjust the operation of the consumer or to identify a malfunction in the system, if the detected voltage falls below the minimum value.

The minimum value may be fallen below for different reasons. For one thing, this is the case, for example, when the electrical energy stored in the energy store is not sufficient to exceed the minimum value. This is the case, for example, if the charging state of the energy store is critically low. A technical error in the connection from the energy store to the system is also possible, such as a loose supply cable or the like. As the system ages, the electrical resistance of the conductors may also increase due to corrosion phenomena on the electric conductors to such an extent that the voltage supply is impaired and the voltage level falls below the minimum value.

If it is detected in the request in step S3 that the detected voltage is above the minimum value (j), the consumer is then started up in a following step S4 and marked as activated for the further operation of the system, so that other control units may also access and use the consumer.

If, however, it is detected in the request in step S3 that the voltage is below the minimum value (n), a counter in a non-volatile memory of the control unit is then initially set in a step S5 and the process is referred back to step S2 for the purpose of test reactivating the consumer.

In a further request in step S6, the number of the stored counters is monitored. In this process, the number is compared to a predefinable maximum number. As long as the detected number is below the maximum number (n), the counter content continues to be monitored. If, however, it is detected that the counter number has reached the maximum number (j), the consumer is then deactivated in a following step S7 and any further test activation is discontinued in step S2.

In this way, the consumer and the system overall are prevented from overload resulting from repeated test activation of the consumer, as a result of which the service life of the system is increased and damage or wear and tear of the system is prevented or reduced.

Upon the deactivation of the consumer, a monitoring is started in a step S8 which monitors the system with regard to whether an event occurs, which gives reason to assume that the voltage in the system could now exceed the minimum value. The elapse of a predefinable period of time is provided as such an event, for example. After a period of time has elapsed, for example, which is considerably longer than the time duration present between multiple test activations within a normal test cycle, a test reactivation of the consumer is carried out, in order to check the instantaneous state of the system and of the consumer, in particular.

Alternatively, a generator, which is also integrated in the system, is preferably monitored with regard to its operation. If the generator is operated regeneratively, for example, i.e., electrical energy is generated and fed into the system, it is assumed that the voltage in the system has now increased.

Consequently, upon the detection of the regenerative operation of the generator or, alternatively or additionally, after the elapse of the predefined period of time (j), the test activation of the consumer is resumed in step S2 and the method is carried out as described above until the consumer is either deactivated (step S7) or activated (step S4).

Figure 2:
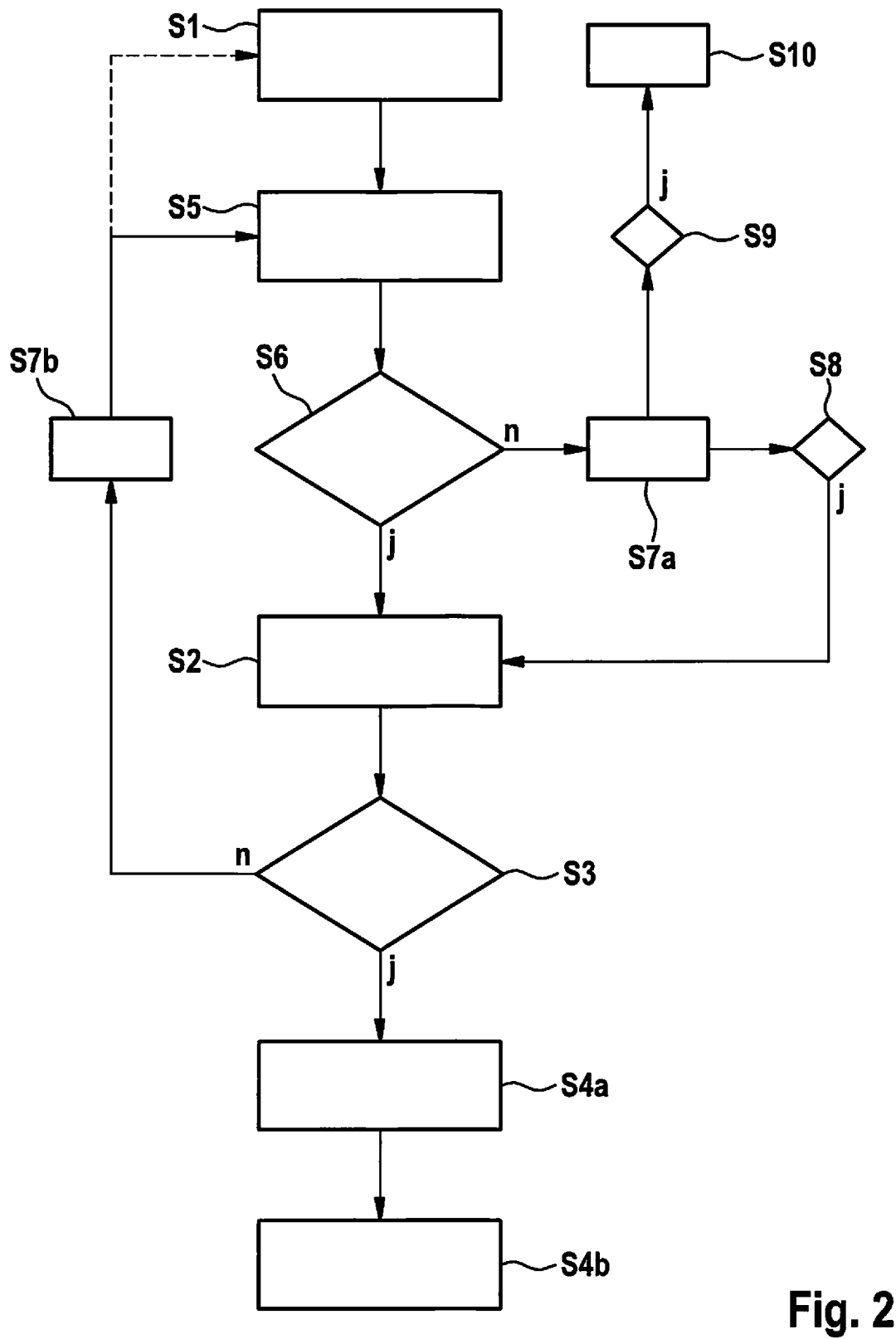
FIG. 2 shows a flow chart for explaining another exemplary embodiment of the method.

FIG. 2 shows another exemplary embodiment of the above-described method, already known steps being provided with the same reference numerals and thus reference is made to the above-mentioned description. It is essentially differences that are to be discussed below.

In contrast to the preceding exemplary embodiment, the sequence of the increase in the counter (step S5) as well as the test activation (step S2) has now been switched in the present exemplary embodiment of FIG. 2. As a result, the counter is set already upon the test activation of the consumer. This has the advantage that even in the case of a restart or of an interruption of the activation, the counter content is already available, whereas, if the counter is set only retroactively after an interruption, there is a risk of not being able to set the counter in time before the interruption of the activation, so that the counter content is not noted correctly.

As a consequence of this restructuring of the method, step S2 is now also divided into two substeps S7a and S7b. Step S7a follows S6 and thus the check of the counter content including the degradation of the system and the wait for recovery or restart. Step S7b follows as a waiting step for time delay prior to a new increase in the counter in step S5 and a potential repetition of the test activation in step S2. In the case that an interruption ensues as a result of insufficient voltage in step S3, the process may be referred back to step S1 to restart the initialization of the system.

Step S4 is now also divided into two substeps S4a and S4b, to show that the counter is set to zero after a test activation has been carried out successfully and upon reaching full operation. In step S4a, the activation of the consumer is therefore carried out, and in step S4b, the activation or release of the entire system is carried out.

If, after the maximum counter content has been reached in step S6, it is decided to deactivate the consumer, the deactivation of the consumer in step S7a is monitored in step S9 and, after deactivation has taken place, the counter content is set to zero in following step S10.

In addition to the counter content itself, it is preferably also monitored how often the counter content has reached the maximum number. This is used to ensure a state of final degradation or deactivation when the test activation has been terminated multiple times, even after ensuring the energy supply and the counter content has been reset multiple times due to the recovery of the system.

What is claimed is:

1. A method for operating an electrical system that includes at least one electrical consumer, at least one energy source for electrical energy, and at least one control unit, comprising:
    test-activating the consumer by the control unit in order to start the electrical system;
    monitoring a voltage level of an electrical voltage in the electrical system;
    comparing the voltage level to a predefinable minimum value;
    interrupting the test-activating if the voltage level falls below the minimum value;
    subsequently test-reactivating the consumer;
    counting a number of interruptions; and
    deactivating the consumer at least for a predefinable period of time upon the counting reaching a predefinable maximum number.

2. The method as recited in claim 1, further comprising outputting a warning upon the deactivating of the consumer.

3. The method as recited in claim 1, further comprising engaging an emergency operation of the electrical system upon the deactivating of the consumer.

4. The method as recited in claim 1, the counting includes setting a counter in a non-volatile memory of the control unit upon each interruption.

5. The method as recited in claim 1, further comprising monitoring an output voltage of an electrical store that forms the energy source, wherein the output voltage corresponds to the voltage level.

6. The method as recited in claim 1, wherein the voltage level continues to be monitored after the deactivating of the consumer, and wherein the consumer is test-reactivated if the voltage level exceeds a predefinable limiting value.

7. The method as recited in claim 1, further comprising monitoring an operating mode of an electric generator of the electrical system after the deactivating of the consumer, wherein the consumer is test-activated upon a detecting of a regenerative operation.

8. The method as recited in claim 7, wherein the consumer is activated after the test-activating of the consumer has been carried out without the consumer falling below the minimum value, and wherein the number of the interruptions that previously occurred is deleted or set to zero.

9. The method as recited in claim 1, wherein the electrical system is of a motor vehicle.

10. A control unit for operating an electrical system that includes at least one electrical consumer and at least one energy source for electrical energy, wherein the control unit is specifically configured to carry out a method for operating the electrical system, the method comprising:
    test-activating the consumer by the control unit in order to start the electrical system;
    monitoring a voltage level of an electrical voltage in the electrical system;
    comparing the voltage level to a predefinable minimum value;
    interrupting the test-activating if the voltage level falls below the minimum value;
    subsequently test-reactivating the consumer;
    counting a number of interruptions; and
    deactivating the consumer at least for a predefinable period of time upon the counting reaching a predefinable maximum number.

11. The control unit as recited in claim 10, wherein the electrical system is of a motor vehicle.

12. An electrical system that includes at least one energy source for electrical energy, at least one electrical consumer, and at least one control unit for operating the electrical system, wherein the control unit is specifically configured to carry out a method for operating the electrical system, the method comprising:
    test-activating the consumer by the control unit in order to start the electrical system;
    monitoring a voltage level of an electrical voltage in the electrical system;
    comparing the voltage level to a predefinable minimum value;
    interrupting the test-activating if the voltage level falls below the minimum value;
    subsequently test-reactivating the consumer;
    counting a number of interruptions; and deactivating the consumer at least for a predefinable period of time upon the counting reaching a predefinable maximum number.

13. The electrical system as recited in claim 12, wherein the electrical system is one of a traction system and an electrical system of a motor vehicle.

* * * * *